Feb. 23, 1926.
A. O. ABBOTT, JR
1,574,542
MACHINE FOR FORMING AND VULCANIZING STRIP MATERIAL CONTAINING
RUBBER OR THE LIKE
Filed May 7, 1924     2 Sheets-Sheet 1
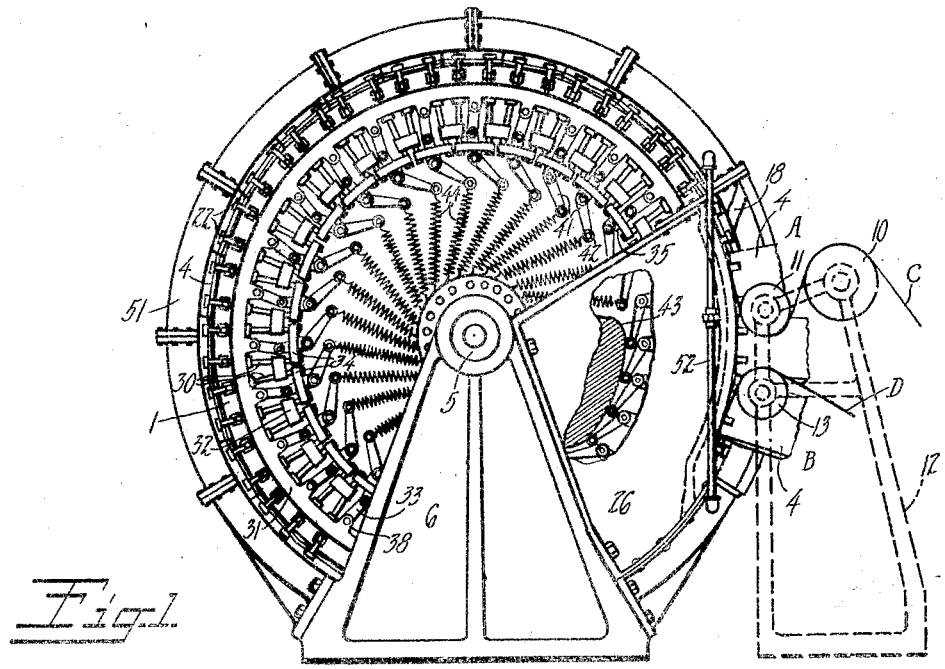
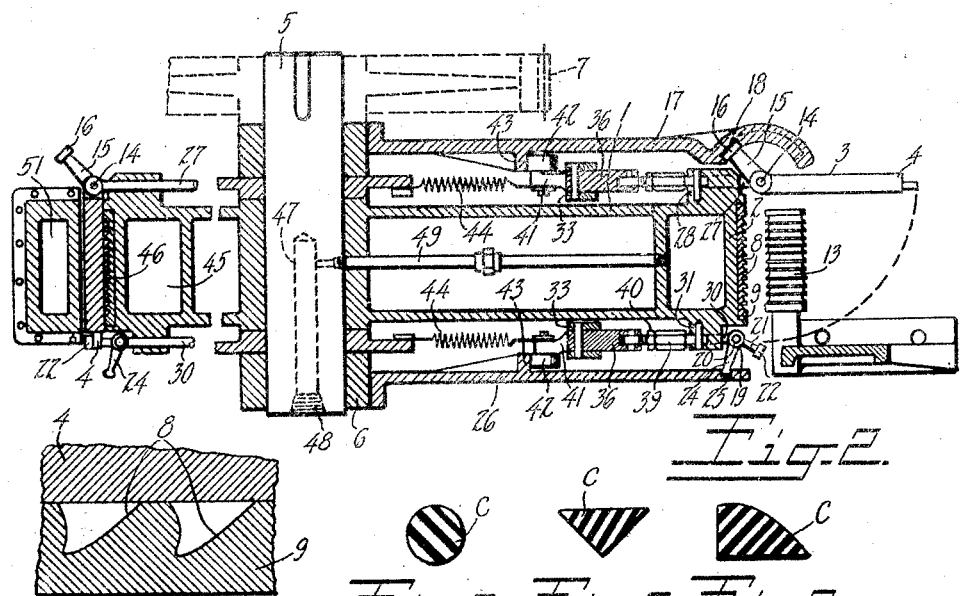
INVENTOR
ADRIAN O. ABBOTT, JR.
BY
HIS ATTORNEY

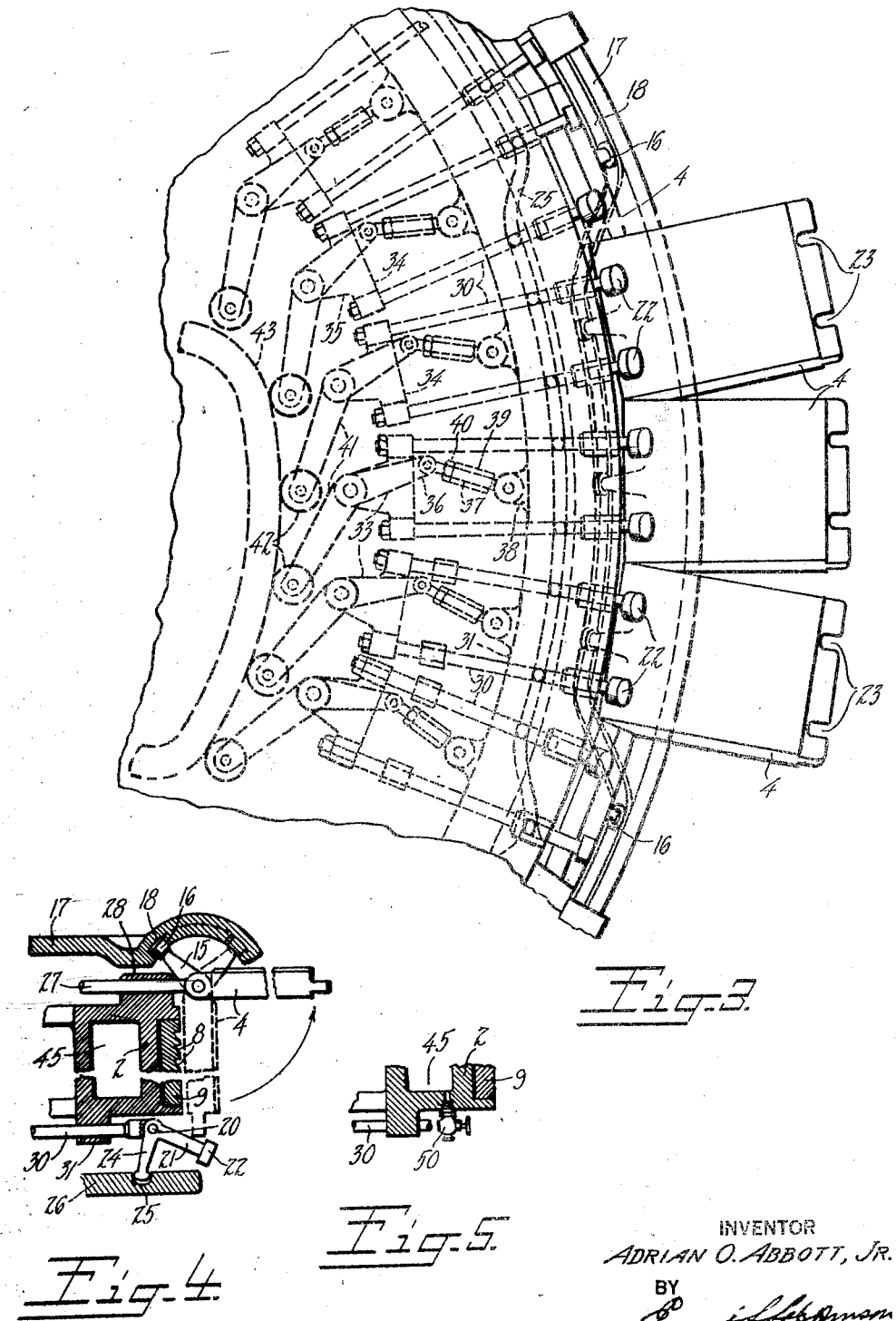

Patented Feb. 23, 1926.

1,574,542

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

MACHINE FOR FORMING AND VULCANIZING STRIP MATERIAL CONTAINING RUBBER OR THE LIKE.

Application filed May 7, 1924. Serial No. 711,563.

*To all whom it may concern:*

Be it known that I, ADRIAN O. ABBOTT, Jr., a citizen of the United States, and a resident of Detroit, county of Wayne, and State of Michigan, have invented certain new and useful Improvements in Machines for Forming and Vulcanizing Strip Material Containing Rubber or the like, of which the following is a full, clear, and exact description.

This invention relates to a machine for manufacturing products in strip form from material containing rubber or the like, and has for its principal object, forming and vulcanizing the material, by a continuous operation, whereby a product may be obtained of any desired length. By this means a strip-like product may be made of any desired length and thereafter cut up in the various lengths desired for their intended purposes without any waste of the material and without the necessity for splicing the parts together to obtain the desired lengths.

Referring to the drawings:—

Figure 1 is a side elevation of the machine with portions thereof shown in dash lines and other portions broken away;

Figure 2 is an enlarged broken horizontal sectional view through the center of Figure 1;

Figure 3 is an enlarged fragmental side view showing parts to the right in Figure 1;

Figure 4 is a fragmental broken sectional view of the right-hand portion shown in Figure 2 taken on a plane slightly behind the plane of Figure 2;

Figure 5 is a fragmental sectional view showing a petcock communicating with the steam chamber;

Figure 6 is a fragmental sectional view showing one type of mold cavity; and

Figures 7, 8 and 9 are sectional views of the material roughly shaped before feeding to the machine.

The invention is adapted for the manufacture of a large variety of products employing plastics such as rubber or the like. For the purpose of illustration however the apparatus shown in the drawings has been constructed with mold cavities for molding beads for pneumatic tire casings, and the invention will therefore hereafter be described more in particular with reference to this article or product, but without in any way intending to narrow the scope of the apparatus or the method involved.

The material, which may be either in whole or in part made of a suitable vulcanizable plastic, is first preferably reduced to strip form having the rough cross section of the finished product. Figures 7, 8 and 9 show three such rough cross sections. These may be formed entirely of plastic, or where for instance a wire is to be insulated for serving as an electrical conductor or where a tire bead is to be reinforced by a wire, fabric, or otherwise, these elements will be incorporated with the plastic in the unfinished or rough condition shown in Figures 7, 8 and 9. For convenience the term "strip" is employed in describing the roughly shaped material or vulcanized product regardless of the actual character of the product or article produced. These strips which will usually be of great lengths and wound upon a reel or reels are simultaneously subjected to the action of rigid mold walls and of a vulcanizing heat to definitely shape and vulcanize them in a progressive continuous manner. The mold walls and mold cavity, when a tire casing bead is to be formed, is shown in Figure 6. When the product is formed and vulcanized to the desired degree the forming and vulcanizing actions are discontinued in a progressive continuous manner whereby a product of any desired length is produced by a continuous operation.

The drawings forming part of the present specification illustrate a preferred embodiment for carrying out the steps just set forth and comprise broadly viewed, a mold having a continuous or endless mold cavity adapted to be opened and closed fractionally, a station for feeding the material to the mold, a station for receiving the product from the mold, means for producing continuous relative movement between the mold and stations whereby the endless mold cavity will pass the stations in a continuous progressive manner, means for progressively opening the mold fractionally in advance of the receiving station, means for closing the mold upon leaving the feeding station, and means for heating the mold.

The mold 1 is composed of oppositely disposed coacting parts 2 and 3, the part 2 being in the form of a drum and the part 3 being formed of a plurality of sections 4.

The mold is secured on a shaft 5 which is rotatably mounted in a frame 6 and has secured at an extended end a drive wheel shown as a gear wheel 7 for rotating the mold which may be driven by any desired source of power (not shown).

The mold is provided with an endless mold cavity which may be formed in the adjacent faces of the coacting parts 2 and 3. In the present instance the mold cavity formed in the part 2 is formed on the periphery thereof, a feature of the present invention being that a number of such cavities may be formed on the periphery, making it possible to produce a number of articles, either of the same or different cross section, at the same time in a single organism and without increasing the number of operatives thereby reducing the cost of production to a minimum. In the drawings is shown a series of mold cavities 8 formed on the periphery of the mold part 2 of a shape to produce beads for automobile casings. It is not necessary in this particular instance to form coacting cavities in the sections 4, although obviously this will be done in the usual manner where the cross section of the product requires it. Therefore in the present instance the sections 4 are simply provided with plain coacting faces, serving as covers for closing the cavities 8, shown in the enlarged view, Figure 6. The cavities are preferably formed in a steel rim 9 supported on the periphery of the drum 2.

The mold as viewed in Figure 1 is driven counterclockwise and at the right-hand side is provided a station A for feeding the material to the mold, and below it a station B for receiving the product from the mold. The strips C being fed to the machine will usually be drawn from reels containing the material (not shown) or they may come directly from tubing machines. In feeding the strips to the respective mold cavities they are preferably led around grooved rolls 10 and 11 mounted in an auxiliary frame 12 at the feeding station A. The rolls contain the same number of properly shaped grooves as there are mold cavities, the grooves being in exact alignment with the respective cavities for guiding the strip in an obvious manner to the endless mold cavities. A roll 13 is likewise mounted in the frame 12 at the receiving station B and provided with suitable grooves accurately aligned with the mold cavities for receiving the strip product D coming from the mold. These strips may be wound upon reels (not shown) or otherwise handled as desired.

The mold, as before stated is mounted on the before-mentioned shaft 5 and driven by the wheel 7, means being thereby provided for producing continuous relative motion between the mold and stations whereby the endless mold cavity will pass the stations in a continuous progressive manner enabling the material to be fed to the mold cavities and the product received from the cavities in a continuous operation.

It is obvious that the mold must be open when the material is fed to it and the product is received from it, and to this end the part 3 is formed with the series of sections 4 so that the mold may be progressively opened fractionally in advance of the receiving station and similarly closed after leaving the feeding station. To permit of this means is provided for progressively moving said sections relative to the mold drum part 2 and to accomplish this the sections 4 are hinged, in a manner that will later be described, at one side of the drum 2 by the pivotal connections 14, and means is provided for progressively swinging the sections open about their hinges when reaching the receiving station and for swinging the sections closed after passing the feeding station.

To produce the swinging movements the sections are each provided at the hinged portion with an extending cam-groove-engaging member, shown in the present instance as an arm 15 carrying an anti-friction roller 16. A segmental cam plate 17 is secured to the frame 6 and provided with a cam groove 18 for engaging the anti-friction rollers 16. This cam groove extends from a point in advance of the receiving station B to a point beyond the feeding station A. The entrance to the cam groove is so positioned that as the drum rotates the successively advancing rollers 16 of the closed sections will enter the groove. The forward part of the groove is so directed that by its cooperation with the said rollers, means are provided for swinging the sections progressively to fractionally open the mold in order that the product may be taken therefrom at the receiving station. The groove is then directed so as to maintain the fraction of the mold open until it passes the feeding station thereby permitting the material to be fed to the mold. The groove is then so directed that by its cooperation with the rollers 16 means will be provided for swinging the sections to fractionally close the mold in a progressive manner whereupon the rollers will leave the groove. Figures 1 and 3 show three of the mold sections open, a fourth about to be opened and a fifth just closed, all five having their rollers 16 engaged by the groove 18. In this particular embodiment the mold will be opened at the feeding and receiving stations over a space covered by three sections, and as the drum revolves the mold will be opened and closed fractionally as the sections are swung open and closed in a progressive manner always providing a fractional opening equal to three sections. Figure 2 shows the path in dash lines that the section takes in swinging open and closed. Figure 4 shows the two extreme positions of a section and its cam-groove-engaging arm. By this construction it will be observed that the means provided will move the sections to one side of the stations in opening the mold fractionally to present an open unobstructed fraction of the mold to the said stations.

As the mold sections 4 are only secured to the drum at their hinged ends it is desirable to also provide means for closing them at their opposite ends. In the preferred embodiment latches 19 are provided for the sections which are hinged in a manner to be later described to the side of the drum opposite the hinges of the sections 4 by the pivotal connections 20. Two latches are provided for each section, each being composed of a swinging arm 21 terminating in a head 22 which engages an open slot 23 formed in the end of the section 4.

Means are provided for swinging the latches to release them from engagement with the sections as the sections are about to be swung open and for engaging them with the sections when the sections have been swung closed. This is accomplished in the present instance by cam-groove-engaging arms 24 extending from the latches at their hinged portion and a cam groove 25 formed in a cam plate 26 secured to the frame 6. This cam groove extends from a point in advance of the receiving station B to a point beyond the feeding station A. The entrance to the cam groove is so positioned that as the drum rotates the successively advancing arms 24 will enter the groove. These latches are holding the sections closed and the forward part of the cam groove is so directed that, by its co-operation with the said arms, means are provided for swinging the latches progressively to release them from the mold sections. The groove is so directed at its opposite end that by its co-operation with the arms 24 means will be provided for swinging the latches, after the sections have been closed, to again latch them in their closed positions. The cam grooves 18 and 25 are so placed relatively that the releasing of the latches and the swinging of the sections to open them will be timed to take effect consecutively in advance of the receiving station, and likewise, the swinging of the sections closed and the engaging of them by the latches will be timed to operate consecutively upon the sections leaving the feeding station.

After the mold sections have been closed it is desirable to so hold them under pressure. They therefore are preferably closed and latched in slightly spaced relation from the drum as shown in Figure 4 and means are provided for thereafter drawing the sections toward the drum. This produces a final shaping of the material fed to the mold cavities and draws the mold sections closer together at their side faces thereby producing a substantially closed cover for the drum. The pressure producing means is preferably released in advance of the receiving station in order that the hinged parts may be free to be swung to permit the opening of the sections.

To produce the desired pressure both the sections 4 and latches 19 are pivotally secured to members movably engaged by the drum, the members for the sections being in the form of slide rods 27 slidably mounted in orifices formed in the peripheral flange 28 extending laterally from the drum, while the members for the latches are likewise in the form of slide rods 30 slidably engaged in orifices formed in the peripheral flange 31 and lugs 32 extending laterally from the opposite side of the drum. These two series of rods are disposed radially of the drum and are adapted to move or slide outwardly and inwardly. The outward movement forces the section 4, operated by a set of rods, free from the mold cavities on the drum. This is timed to take place just before the latch is released and the section is swung open upon reaching the receiving station. The inward movement draws the mold section tightly against the drum when the section has been closed and latched after leaving the feeding station.

The pressure applying rods are operated by similar mechanism, and therefore, a single description will suffice. The mechanism includes toggles 33, a single toggle being provided for each pair of the rods 27 and 30. Each pair of rods 30 is connected by a yoke 34 provided with a lug 35, and similar pairs of the rods 27 are likewise connected by yokes provided with lugs (not shown). The toggles are composed of pivotally connected links 36 and 37. The links 36 have their free ends pivotally connected to the beforementioned lugs connecting the respective pairs of rods 27 and 30. The free ends of the links 37 are pivotally connected to lugs 38 formed on the peripheral flanges 28 and 31. The links 37 are preferably made adjustable by forming them in sections connected together by the right and left threaded nut 39 preferably secured in position by lock nut 40. This provides a ready means for a fine adjustment of the toggle to insure the proper pressure being applied to the closed mold sections.

In order to set the toggles to produce the pressure and to release them to release the pressure, the links 36 are provided with operating arms 41 which are provided at their free ends with anti-friction rollers 42. These rollers engage camways 43 formed on the cam plates 17 and 26. The arms 41 are under the pull of coil springs 44, a spring being provided for each arm having one of its ends secured to the free end of the arm and its other end anchored to the drum. The springs normally exert a pull on the arms tending to set the toggles to effective positions toward or at their dead center point as may be desired to exert the required pressure on the closed mold parts.

The springs are effective for the major portion of the rotation of the drum during which time the mold sections are closed and the material enclosed by them is being shaped and vulcanized. The camways 43 are positioned to be effective at a point in advance of the receiving station B where as the drum rotates the successively advancing rollers 42 will be engaged by them. The forward part of the camways is so directed that by its co-operation with the said rollers means are provided for swinging the arms 41 against the tension of the springs for releasing the toggles, and for simultaneously moving or sliding the rods 27 and 30 radially outward to release the pressure on the mold sections and to permit them to move out as shown in dotted lines in Figure 4 preliminary to swinging the latches and sections to fractionally open the mold. The camways are then directed so as to maintain these outward positions of the rods while the mold sections are open. The camways are then directed so that, by their co-operation with the rollers 42, means will be provided for permitting the springs to again act to draw the rods radially back to their former positions, the sections and latches receiving the full effect of the springs when the rollers have left the camways. This is accomplished after the swinging movements of the section and latches have taken place to close and latch the section, this position being shown to the left in Figure 2. The pair of camways 43 are so placed relatively that the rod supporting a section and the rods supporting the latches therefor will operate simultaneously.

While the strips of material are being subjected to this pressure they are being forced to conform to the configuration of the mold cavity and simultaneously therewith are being vulcanized to the desired degree either wholly or partially as is suitable for any particular purpose. To accomplish this means are provided for heating the mold which should be for at least the period while it is moving through the arc when the mold parts are closed under pressure. To accomplish this in the present instance the drum is provided with an annular chamber 45 for containing steam or other heating medium. This serves to heat the mold wall 46 which is made comparatively thin for this purpose. The heating medium, preferably steam, is supplied to the chamber by a conduit 47 formed in the shaft 5 and furnished with a stuffing box 48 for connecting it to the supply conduit (not shown) in the usual manner to admit a supply of steam while the shaft is revolving. The conduit 47 is connected to the chamber 45 by a conduit 49, live steam or other heating medium being thereby supplied to the chamber 45 at all times under any desired degree of heat or pressure. One or more petcocks 50 are tapped into the chamber 45 at the base thereof to permit any entrapped air to be moved as well as any condensation where steam is employed as the heating medium. The outer part 3 of the mold is preferably heated by providing a circular chamber 51 encircling the mold for the major portion thereof but terminating at either side of the stations to permit an open unobstructed space to be provided at these points, the terminals of the chamber being connected by a pipe 52 which spans the gap at one side of the stations.

As the operation of the machine has been set forth in detail while describing the various parts, it is thought that but a brief description is therefore necessary of the main steps in the operation of the parts. The material C is fed continuously to the mold cavities of the partially opened mold at the feeding station A from the source of supply. The mold sections 4 after passing this station are closed and latched with the latches 19 by the simultaneous coacting of the arms 15 and the cam groove 18, and the arms 24 and the cam groove 25. The section 4 is then forced into pressure engagement with the drum 2 by the simultaneous radial inward movement of the rods 27 and 30 due to the releasing by the camways 43 of the anti-friction rollers 42 and the concurrent action of the springs 44. The mold thus fractionally closed passes, with the rotation of the drum, around to the receiving station, during which time the material is being formed and vulcanized. On reaching the receiving station the tension of the springs 44 is arrested by the co-operation of the rollers 42 and camways 43 with which they have now engaged. This releases the toggles and moves the rods 27 and 30 radially outward to thereby free the section. The latches 19 are then swung to release them from the section, by the co-operation of the arms 24 and the cam groove 25 with which they have now engaged. The section 4 is then swung open, by the co-operation of the arm 15 and its cam groove 18 with which it is then engaged. The fractionally open mold thus passes the stations. The finished product is taken therefrom at the receiving station and the roughly shaped strip fed thereto at the feeding station, after which the mold is again closed as previously described. These operations continue in a regular sequence, each mold section opening and closing, upon reaching and leaving the stations, as the drum rotates, thereby providing a continuously operating machine for producing strip material of any desired length and cross section.

As many apparently widely different embodiments of this invention may be made without departing from the spirit thereof, it is to be understood that I do not intend to limit myself to the specific form of the invention as set forth except as indicated in the appended claims.

Having thus described my invention, what I claim and desire to protect by Letters Patent is:—

1. A machine for forming and vulcanizing material containing rubber or the like in strip form by a continuous operation, comprising a mold containing an endless mold cavity for the material, a station for feeding the material to the mold, a station for receiving the product from the mold, means for producing continuous relative movement between the mold and stations whereby the endless mold cavity will pass the stations in a continuous progressive manner, means for progressively opening the mold fractionally in advance of the receiving station, means for closing same upon leaving the feeding station, and means for heating the mold.

2. A machine for forming and vulcanizing material containing rubber or the like in strip form by a continuous operation, comprising a mold containing an endless mold cavity for the material, a station for feeding the material to the mold, a station for receiving the product from the mold, means for producing continuous relative movement between the mold and stations whereby the endless mold cavity will pass the stations in a continuous progressive manner, means for progressively opening the mold fractionally in advance of the receiving station, means for closing the mold upon leaving the feeding station, means for holding the mold closed under pressure, and means for heating the mold.

3. A machine for forming and vulcanizing material containing rubber or the like in strip form by a continuous operation, comprising a mold containing an endless mold cavity for the material, a station for feeding the material to the mold, a station for receiving the product from the mold, means for rotating the mold whereby the endless mold cavity will pass the stations in a continuous progressive manner, means for progressively opening the mold fractionally in advance of the receiving station, means for closing same upon leaving the feeding station, and means for heating the mold.

4. A machine for forming and vulcanizing material containing rubber or the like in strip form by a continuous operation, comprising a mold containing an endless mold cavity for the material having oppositely disposed coacting parts one of the coacting parts being formed in sections, a station for feeding the material to the mold, a station for receiving the product from the mold, means for rotating the mold whereby the endless mold cavity will pass the stations in a continuous progressive manner, means for progressively moving said sections to open the mold fractionally in advance of the receiving station, means for closing same upon leaving the feeding station, and means for heating the mold.

5. A machine for forming and vulcanizing material containing rubber or the like in strip form by a continuous operation, comprising a mold containing an endless mold cavity for the material having oppositely disposed coacting parts one of the coacting parts being formed in sections, a station for feeding the material to the mold, a station for receiving the product from the mold, means for rotating the mold whereby the endless mold cavity will pass the stations in a continuous progressive manner, means for progressively moving said sections to one side of said stations to open the mold fractionally in advance of the receiving station to present an open unobstructed fraction of the mold to the said stations, means for closing same upon leaving the feeding station, and means for heating the mold.

6. A machine for forming and vulcanizing material containing rubber or the like in strip form by a continuous operation, comprising a mold containing an endless mold cavity for the material, a station for feeding the material to the mold, a station for receiving the product from the mold, means for rotating the mold whereby the endless mold cavity will pass the stations in a continuous progressive manner, means for progressively opening the mold fractionally in advance of the receiving station, means for closing same upon leaving the feeding station, and means for heating the mold including a fixed heating chamber surrounding the mold beyond the said stations where the mold opens and closes.

7. A machine for forming and vulcanizing material containing rubber or the like in strip form by a continuous operation, comprising a mold containing an endless mold cavity for the material having oppositely disposed coacting parts one of said coacting parts being in the form of a drum the mold cavity formed therein being on the periphery thereof, the other of said coacting parts being formed in sections hinged to said drum, a station for feeding the material to the mold, a station for receiving the product from the mold, means for rotating the mold for presenting the entire peripheral mold cavity to the stations in a continuous progressive manner, means for progressively swinging said sections about their hinges to open the mold fractionally in advance of the receiving station to present an open unobstructed fraction of the said peripheral mold cavity to the said stations, means for swinging the open sections closed upon leaving the feeding station, and means for heating the mold.

8. A machine for forming and vulcanizing material containing rubber or the like in strip form by a continuous operation, comprising a mold containing an endless mold cavity for the material having oppositely disposed coacting parts one of said coacting parts being in the form of a drum the mold cavity formed therein being on the periphery thereof, the other of the said coacting parts being formed in sections hinged to said drum, a station for feeding the material to the mold, a station for receiving the product from the mold, means for rotating the mold for presenting the entire peripheral mold cavity to the stations in a continuous progressive manner, means for progressively swinging said sections about their hinges to open the mold fractionally in advance of the receiving station to present an open unobstructed fraction of the said peripheral mold cavity to the said stations, means for swinging the open sections closed upon leaving the feeding station, and means for heating the mold including a fixed heating chamber surrounding the mold beyond the said stations where the mold opens and closes.

9. A machine for forming and vulcanizing material containing rubber or the like in strip form by a continuous operation, comprising a mold containing an endless mold cavity for the material having oppositely disposed coacting parts one of said coacting parts being in the form of a drum the mold cavity formed therein being on the periphery thereof, the other of the said coacting parts being formed in sections hinged to one side of said drum, a latch for each section secured at the opposite side of said drum, a station for feeding the material to the mold, a station for receiving the product from the mold, means for rotating the mold for presenting the entire peripheral mold cavity to the stations in a continuous progressive manner, means for progressively releasing the latches from the sections, means for progressively swinging said sections about their hinges to fractionally open the mold, said latch releasing and section swinging means being timed to operate in advance of the receiving station to present an open unobstructed fraction of the said peripheral mold cavity to the said stations, means for swinging the open sections closed, means for operating the latches to engage the closed sections, said section closing means and said latch operating means being timed to operate upon the sections leaving the feeding station, and means for heating the mold.

10. A machine for forming and vulcanizing material containing rubber or the like in strip form by a continuous operation, comprising a mold containing an endless mold cavity for the material having oppositely disposed coacting parts one of said coacting parts being in the form of a drum the mold cavity formed therein being on the periphery thereof, the other of the said coacting parts being formed in sections, a station for feeding the material to the mold, a station for receiving the product from the mold, means for rotating the mold for presenting the entire peripheral mold cavity to the stations in a continuous progressive manner, means for moving said sections to progressively open the mold fractionally in advance of the receiving station, means for closing same upon leaving the feeding station, means for holding the closed parts of the mold together under pressure, and means for heating the mold.

11. A machine for forming and vulcanizing material containing rubber or the like in strip form by a continuous operation, comprising a mold containing an endless mold cavity for the material having oppositely disposed coacting parts one of said parts being in the form of a drum the mold cavity formed therein being on the periphery thereof, the other of the said coacting parts being formed in sections hinged to one side of said drum, latching means for each section secured at the opposite side of said drum, a station for feeding the material to the mold, a station for receiving the product from the mold, means for rotating the mold for presenting the entire peripheral mold cavity to the stations in a continuous progressive manner, means for progressively releasing the latching means, means for progressively swinging said sections about their hinges to fractionally open the mold, said latch releasing and section swinging means being timed to operate in advance of the receiving station to present an open unobstructed fraction of the said peripheral mold cavity to the said stations, means for swinging the open sections closed, means for applying the latching means to said closed sections, said section closing and latch applying means being timed to operate upon the sections leaving the feeding station, means for holding the closed parts of the mold together under pressure after leaving said feeding station, means for releasing said holding means in advance of said receiving station, and means for heating the mold.

12. A machine for forming and vulcanizing material containing rubber or the like in strip form by a continuous operation, comprising a mold containing an endless mold cavity for the material having oppositely disposed coacting parts one of said parts being in the form of a drum the mold cavity formed therein being on the periphery thereof, the other of the said coacting parts being formed in sections, a station for feeding the material to the mold, a station for receiving the product from the mold, means for rotating the mold for presenting the entire peripheral mold cavity to the stations in a continuous progressive manner, means slidably engaged by said drum for pivotally supporting each section, a cam-groove-engaging member extending from each of said sections, a cam plate having a cam groove for engaging said member extending from a point in advance of said receiving station to a point beyond said feeding station adapted to provide means for progressively swinging the sections open in advance of the receiving station and to provide means for swinging the sections closed after passing the feeding station, latching means for each section, means slidably engaged by said drum for pivotally supporting each of said latching means, a cam-groove-engaging member extending from each of said latching means, a cam plate having a cam groove for engaging said last mentioned members extending from a point in advance of said receiving station to a point beyond said feeding station adapted to provide means for progressively swinging the latching means to release the sections in advance of the receiving station and to provide means for swinging the latching means to latch the sections after passing the feeding station, means applied to said slidable means pivotally secured to the sections and means applied to said slidable means pivotally secured to said latching means, for holding the sections closed under pressure, and means for heating the mold.

13. A machine for forming and vulcanizing material containing rubber or the like in strip form by a continuous operation, comprising a mold containing an endless mold cavity for the material, a station for feeding the material to the mold, a station for receiving the product from the mold, means for rotating the mold whereby the endless mold cavity will pass the stations in a continuous progressive manner, means for progressively opening the mold fractionally in advance of the receiving station, means for closing same upon leaving the feeding station, means for holding the mold closed under pressure including toggles, and means for heating the mold.

14. A machine for forming and vulcanizing material containing rubber or the like in strip form by a continuous operation, comprising a mold containing an endless mold cavity for the material having oppositely disposed coacting parts one of the coacting parts being formed in sections, a station for feeding the material to the mold, a station for receiving the product from the mold, means for rotating the mold whereby the endless mold cavity will pass the stations in a continuous progressive manner, means for progressively moving said sections to open the mold fractionally in advance of the receiving station, means for closing same upon leaving the feeding station, means for holding the mold closed under pressure including toggles, means for setting the toggles to effective positions after the sections have been closed, means for releasing the toggles prior to opening the sections, and means for heating the mold.

15. A machine for forming and vulcanizing material containing rubber or the like in strip form by a continuous operation, comprising a mold containing an endless mold cavity for the material having oppositely disposed coacting parts one of said parts being in the form of a drum the mold cavity formed therein being on the periphery thereof, the other of the said coacting parts being formed in sections, means movably mounted in the drum for pivotally supporting each section, latching means for each section, means movably mounted in the drum for pivotally supporting each of said latching means, a station for feeding the material to the mold, a station for receiving the product from the mold, means for rotating the mold for presenting the entire peripheral mold cavity to the stations in a continuous progressive manner, means for progressively swinging the latching means to release the sections, means for progressively swinging the sections open about said pivotal connections, said latch releasing and section opening means being timed to operate in advance of the receiving station to present an open unobstructed fraction of the said peripheral mold cavity to the said stations, means for swinging the open sections closed, means for swinging the latching means to latch the sections, said section closing and latching means being timed to operate upon the sections leaving the feeding station, means applied to said movable means pivotally secured to the sections and said movable means pivotally secured to the latching means for holding the closed parts of the mold together under pressure including toggles, means for setting the toggles to effective positions after the sections have been closed, means for releasing the toggles prior to opening the sections, and means for heating the mold.

16. A machine for forming and vulcanizing material containing rubber or the like in strip form by a continuous operation, comprising a mold containing an endless mold cavity for the material having oppositely disposed coacting parts one of said parts being in the form of a drum the mold cavity formed therein being on the periphery thereof, the other of the said coacting parts being formed in sections, a station for feeding the material to the mold, a station for receiving the product from the mold, means for rotating the mold for presenting the entire peripheral mold cavity to the stations in a continuous progressive manner, means slidably engaged by said drum for pivotally supporting each section, a cam-groove-engaging member extending from each of said sections, a cam plate having a cam groove for engaging said member extending from a point in advance of said receiving station to a point beyond said feeding station adapted to provide means for progressively swinging the sections open in advance of the receiving station and to provide means for swinging the sections closed after passing the feeding station, latching means for each section, means slidably engaged by said drum for pivotally supporting each of said latching means, a cam-groove-engaging member extending from each of said latching means, a cam plate having a cam groove for engaging said last mentioned members extending from a point in advance of said receiving station to a point beyond said feeding station adapted to provide means for progressively swinging the latching means to release the sections in advance of the receiving station and to provide means for swinging the latching means to latch the sections after passing the feeding station, toggles having one end secured to the drum and the opposite end secured to the slidable means pivotally secured to the sections and latching means, arms secured to the toggles, springs having one of their ends secured to the drum and their opposite ends secured to the said arms for setting said toggles for holding said mold closed, fixed camways for engaging said arms for releasing said toggles in advance of the receiving station and adapted to permit the springs to operate beyond the feeding station, and means for heating the mold.

Signed at Detroit, in the county of Wayne, and State of Michigan, this 1st day of May, 1924.

ADRIAN O. ABBOTT, Jr.